(12) United States Patent
Ha (10) Patent No.: US 12,111,482 B2
(45) Date of Patent: Oct. 8, 2024

(54) OPTICAL DEVICE FOR AUGMENTED REALITY

(71) Applicant: LETINAR CO., LTD, Anyang-si (KR)

(72) Inventor: Jeong Hun Ha, Seoul (KR)

(73) Assignee: LETINAR CO., LTD., Anyang-si (KR)

( * ) Notice: Subject to any disclaimer, the term of this patent is extended or adjusted under 35 U.S.C. 154(b) by 639 days.

(21) Appl. No.: 17/416,849

(22) PCT Filed: Oct. 17, 2019

(86) PCT No.: PCT/KR2019/013627
§ 371 (c)(1),
(2) Date: Jun. 21, 2021

(87) PCT Pub. No.: WO2020/138669
PCT Pub. Date: Feb. 7, 2020

(65) Prior Publication Data
US 2022/0026735 A1  Jan. 27, 2022

(30) Foreign Application Priority Data
Dec. 26, 2018  (KR) .......... 10-2018-0169286

(51) Int. Cl.
*G02B 30/35*  (2020.01)
*G06T 19/00*  (2011.01)

(52) U.S. Cl.
CPC .......... *G02B 30/35* (2020.01); *G06T 19/006* (2013.01)

(58) Field of Classification Search
CPC ........................................ G02B 30/35
See application file for complete search history.

(56) References Cited

U.S. PATENT DOCUMENTS

| | | | |
|---|---|---|---|
| 8,773,599 B2* | 7/2014 | Saeedi | G02F 1/133504 359/566 |
| 10,459,227 B2* | 10/2019 | Norrell | B23K 9/322 |
| 11,686,943 B2* | 6/2023 | Park | H10K 59/12 345/8 |
| 2018/0149869 A1* | 5/2018 | Bergquist | G02C 7/165 |
| 2018/0292652 A1 | 10/2018 | Ha | |
| 2020/0117004 A1* | 4/2020 | Qin | G02B 27/0172 |

FOREIGN PATENT DOCUMENTS

| | | | |
|---|---|---|---|
| CN | 108227203 A | 6/2018 | |
| JP | 2005-521099 A | 7/2005 | |
| JP | 2018-520380 A | 7/2018 | |
| JP | 2018-132602 A | 8/2018 | |
| KR | 10-1660519 B1 | 9/2016 | |
| KR | 10-2016-0144983 A | 12/2016 | |
| KR | 10-2018-0028339 A | 3/2018 | |
| KR | 10-2018-0121523 A | 11/2018 | |

* cited by examiner

*Primary Examiner* — Robert E. Tallman
(74) *Attorney, Agent, or Firm* — Rabin & Berdo, P.C.

(57) ABSTRACT

An optical device for augmented reality includes an optical means for transmitting at least part of visible light therethrough, a reflective unit disposed inside the optical means, and an image output unit configured to output image light corresponding to an image for augmented reality toward the inner surface of the optical means. The image light corresponding to the image for augmented reality output from the image output unit is reflected at least once from the inner surface of the optical means and transferred to the reflective unit. The reflective unit reflects the transferred image light toward the pupil of an eye of a user, thereby providing the image for augmented reality to the user.

10 Claims, 6 Drawing Sheets

OPTICAL DEVICE FOR AUGMENTED REALITY

TECHNICAL FIELD

The present invention relates to an optical device for augmented reality, and more particularly to an optical device for augmented reality that is capable of providing an augmented reality image to a user by using a reflective structure and a small-sized reflective unit.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for a user to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies using a configuration such as a prism capable of adjusting focal length for a virtual image and a technology for electrically controlling a variable focal lens in response to a change in focal length. However, these technologies also have a problem in that a user needs to perform a separate operation in order to adjust focal length or in that hardware such as a separate processor and software for controlling focal length are required.

In order to overcome the problems of the conventional technologies, the present applicant has developed an apparatus that can implement augmented reality by projecting a virtual image onto the retina through the pupil using a reflective unit having a size smaller than that of the human pupil, as described in Patent Document 1. According to this technology, the apparatus for implementing augmented reality is configured in the form of glasses and a reflective unit is disposed on the surface of a glasses lens or inside the glasses lens to reflect a virtual image generated by a display unit so that an image is formed on the retina through the pupil. Accordingly, a kind of pinhole effect is provided by deepening the depth of field, so that a clear virtual image may always be provided regardless of whether the user changes the focal length while gazing at the real world. However, the technology of the present applicant has a limitation in that the field of view is narrow because the small reflective unit is used.

[Patent Document 1]
Korean Patent No. 10-1660519 (published on Sep. 29, 2016)

DISCLOSURE

Technical Problem

The present invention has been conceived to overcome the above-described problems, and an object of the present invention is to provide an optical device for augmented reality being capable of providing an image for augmented reality by using a reflective structure and a reflective unit smaller than the pupil.

In particular, another object of the present invention is to provide an optical device for augmented reality that may widen field of view, improve luminous uniformity, and reduce the thickness and volume of the device by using a reflective structure and a reflective unit smaller than the pupil.

Furthermore, another object of the present invention is to provide an optical device for augmented reality that has the wide field of view without disconnection of an image for augmented reality by using a reflective structure and a plurality of reflective units and forming the distance between the reflective units to be smaller than the size of the pupil.

Furthermore, still another object of the present invention is to provide an optical device for augmented reality that may widen field of view and an eye box while deepening the depth of field and thus generating a pinhole effect by using a plurality of reflective units smaller than the pupil.

Furthermore, still another object of the present invention is to provide an optical device for augmented reality that has a thin thickness while having a wide field of view and a wide eye box by using a reflective structure and a plurality of reflective units and also forming the individual reflective units on non-contiguous planes.

Furthermore, still another object of the present invention is to provide an optical device for augmented reality that transfers light as much as possible to an eye without blocking the light by using a reflective structure and a plurality of reflective units and also disposing the individual reflective units not to block light reaching each other, thus having high optical efficiency.

Moreover, still another object of the present invention is to provide an optical device for augmented reality that has a wider field of view (FOV) and a wider eye box while maintaining high optical efficiency by using a reflective structure and a plurality of reflective units and also enabling more reflective units to be used while maintaining constant maximum light without an additional increase in the amount of light through the arrangement of reflective units.

Technical Solution

In order to overcome the above technical problems, the present invention provides an optical device for augmented reality, the optical device including: an optical means for transmitting at least part of visible light therethrough; a reflective unit disposed inside the optical means; and an image output unit configured to output image light corresponding to an image for augmented reality toward the inner surface of the optical means; wherein the image light corresponding to the image for augmented reality output from the image output unit is reflected at least once from the inner surface of the optical means and transferred to the reflective unit; and wherein the reflective unit reflects the transferred image light toward the pupil of an eye of a user, thereby providing the image for augmented reality to the user.

In this case, it is preferable that the size of the reflective unit be 8 mm or less.

Furthermore, the size of the reflective unit may be the maximum length between any two points on the boundary line of the reflective unit.

Furthermore, the size of the reflective unit may be the maximum length between any two points on the boundary line of the orthogonal projection of the reflective unit projected onto a plane perpendicular to a forward direction from the pupil when the user gazes forward.

Furthermore, the area of the reflective unit may be formed to have a value of 1672 (mm²) or less.

Furthermore, the area of the reflective unit may be the area of the orthogonal projection of the reflective unit projected onto a plane perpendicular to a forward direction from the pupil when the user gazes forward.

According to another aspect of the present invention, there is provided an optical device for augmented reality, the optical device including: an optical means for transmitting at least part of visible light therethrough; a plurality of reflective units disposed inside the optical means; and an image output unit configured to output image light corresponding to an image for augmented reality toward the inner surface of the optical means; wherein the image light corresponding to the image for augmented reality output from the image output unit is reflected at least once from the inner surface of the optical means, partially separated and transferred to the plurality of reflective units; and wherein the plurality of reflective units reflects the transferred image light toward the pupil of an eye of a user, thereby providing the image for augmented reality to the user.

In this case, the plurality of reflective units may be disposed parallel to the inner surface of the optical means and alongside each other in a first direction, which is a direction in which the image output unit is located, when viewed in a state in which the optical device is placed in front of the user.

Furthermore, a plurality of reflective units may be additionally disposed in second directions that are directions perpendicular to the first direction.

Furthermore, the reflective unit closer to the image output unit may be disposed not to block image light incident on the reflective unit disposed downstream of the former reflective unit.

Furthermore, the reflective unit closer to the image output unit may be disposed to partially block image light incident on the reflective unit disposed downstream of the former reflective unit.

Furthermore, the plurality of reflective units may be disposed such that the angle formed by each of the reflective units with respect to the inner surface of the optical unit and the angle formed by the image light, reflected from the inner surface of the optical unit and passing through the reflective unit, with respect to the inner surface of the optical unit are the same as each other.

Furthermore, each of the plurality of reflective units may be disposed such that the distance to an adjacent reflective unit is 8 mm or less.

Moreover, the distance between the adjacent reflective units may be the minimum value between points on the boundary lines of the orthogonal projections of the adjacent reflective units projected onto a plane perpendicular to a forward direction from the pupil when the user gazes forward.

Advantageous Effects

According to the present invention, there may be provided the optical device for augmented reality that may provide an image for augmented reality by using the reflective structure and the reflective unit smaller than the pupil.

In particular, the present invention may provide the optical device for augmented reality that may widen field of view, improve luminous uniformity, and reduce the thickness and volume of the device by using the reflective structure and the reflective unit smaller than the pupil.

Furthermore, according to the present invention, there may be provided the optical device for augmented reality that has the wide field of view without disconnection of an image for augmented reality by using the reflective structure and the plurality of reflective units and also forming the distance between the reflective units to be smaller than the size of the pupil.

Furthermore, according to the present invention, there may be provided the optical device for augmented reality that may widen field of view and an eye box while deepening the depth of field and thus generating a pinhole effect by using a plurality of reflective units smaller than the pupil.

Furthermore, according to the present invention, there may be provided the optical device for augmented reality that has a thin thickness while having a wide field of view and a wide eye box by using the reflective structure and the plurality of reflective units and also forming the individual reflective units on non-contiguous planes.

Furthermore, according to the present invention, there may be provided the optical device for augmented reality that transfers light as much as possible to an eye without blocking the light by using the reflective structure and the plurality of reflective units and also disposing the individual reflective units not to block light reaching each other, thus having high optical efficiency.

Moreover, according to the present invention, there may be provided the optical device for augmented reality that has a wider field of view (FOV) and a wider eye box while maintaining high optical efficiency by using the reflective structure and the plurality of reflective units and also enabling more reflective units to be used while maintaining constant maximum light without an additional increase in the amount of light through the arrangement of the reflective units.

BEST MODE

Embodiments of the present invention will be described in detail below with reference to the accompanying drawings.

First, the basic principle of an optical device for augmented reality according to the present invention will be described with reference to FIG. 1.

Figure 1:
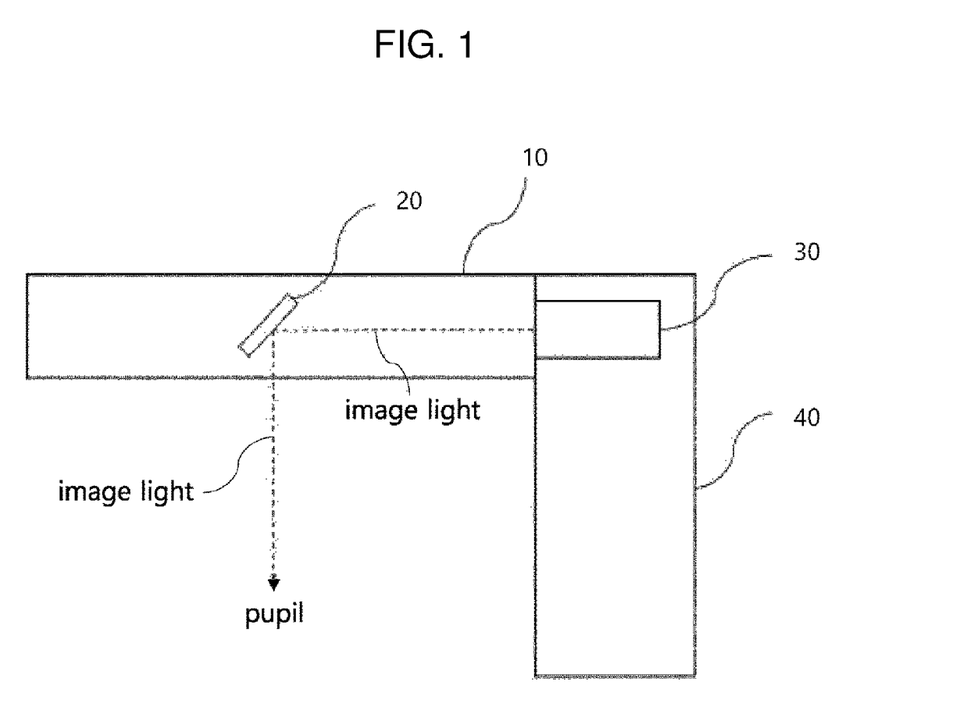
FIG. 1 is a diagram showing an optical device for augmented reality developed by the present applicant as disclosed in Patent Document 1.

FIG. 1 is a diagram showing an optical device for augmented reality developed by the present applicant as disclosed in Patent Document 1.

Referring to FIG. 1, an image output unit 30 is a means for outputting image light corresponding to an image for augmented reality, and may be implemented as, e.g., a small-sized display device. A reflective unit 20 provides an image for augmented reality to a user by reflecting image light, output from the image output unit 30, toward the pupil of the user.

An optical means 10 is a means for transmitting at least part of real object image light, which is image light output from a real object, therethrough, and may be, e.g., a glasses lens. The reflective unit 20 is embedded inside the optical means 10. A frame unit 40 is a means for fixing and supporting both the image output unit 30 and the optical means 10.

The reflective unit 20 shown in FIG. 1 is formed to have a size smaller than that of the human pupil, i.e., 8 mm. By forming the reflective unit 20 to be smaller than the size of the pupil as described above, the depth of field for light incident on the pupil through the reflective unit 20 may be made almost infinite, i.e., considerably deep. Here, the depth of field refers to a range within which an image for augmented reality is recognized as being in focus. When the depth of field gets deeper, a focal length for an image for augmented reality get increased accordingly. Thus, when a user changes the focal length for the real world while gazing at the real world, an image for augmented reality is always recognized as being in focus regardless of a change of the focal length. This may be viewed as a kind of pinhole effect.

The present applicant proposed a technology disclosed in Patent Document 1 based on the idea that the depth of field can be deepened by using the reflective unit 20 having a size smaller than that of the pupil. However, the structure using the reflective unit 20 has the advantage of obtaining an effect such as a pinhole effect by deepening the depth of field, it has a limitation in that the field of view is narrow.

An optical device 100 for augmented reality according to the present invention will be described in greater detail below.

Figure 2:
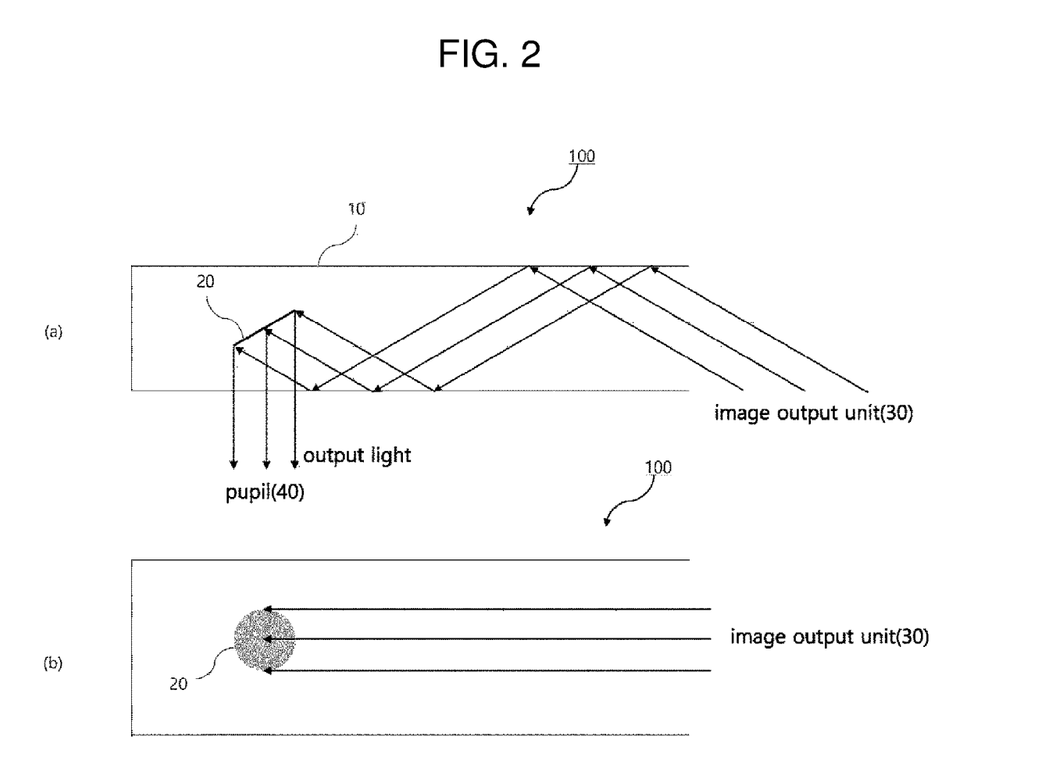
FIG. 2 is a diagram illustrating the configuration of an optical device (100) for augmented reality according to an embodiment of the present invention.

FIG. 2 is a diagram illustrating the configuration of an optical device 100 for augmented reality according to an embodiment of the present invention, wherein FIGS. 2(a) and 2(b) show a plan view and a front view, respectively, when the optical device 100 for augmented reality is placed in front of a user.

Referring to FIG. 2, the optical device 100 for augmented reality includes an optical means 10, a reflective unit 20, and an image output unit 30. The optical device 100 for augmented reality is characterized in that the image light corresponding to an image for augmented reality, output from the image output unit 30, is reflected at least once from the inner surface of the optical means 10 and transferred to the reflective unit 20 and the reflection unit 20 reflects off the transferred image light toward the pupil 40 of an eye of the user, thereby providing the image for augmented reality to the user.

The image output unit 30 is a means for outputting image light corresponding to an image for augmented reality toward the inner surface of the optical means 10, and may be, e.g., a display device such as a small-sized LCD.

The display device is a means for displaying an image for augmented reality on a screen, and displays an image for augmented reality in such a manner as to emit light so that the reflective unit 20 reflects the image for augmented reality to be projected onto the pupil 40 of the user. Image light corresponding to the image for augmented reality displayed on the display device is output toward the inner surface of the optical means 10, is reflected at least once on the inner surface of the optical means 10, and is then transferred to the reflective unit 20.

Meanwhile, the image output unit 30 may be a reflective means or a refractive means that transfers image light, output from such a display device, to the inner surface of the optical means 10 by reflecting or refracting the image light. In this case, the image light output from the display device is not directly output to the inner surface of the optical means 10, but is transferred to the inner surface of the optical means 10 through the reflective means or the refractive means.

Furthermore, the image output unit 30 may be a collimator that outputs image light, output from the display device, as collimated parallel light.

Alternatively, the image output unit 30 may use a collimator in combination with a reflective or refractive means and a display device. When the collimator is used, the image light output from the image output unit 30 is collimated light.

In other words, the image output unit 30 may be the display device, the reflective means, the refractive means, a means such as the collimator, or a combination thereof that outputs the image light, emitted from the display device for displaying an image for augmented reality, toward the inner surface of the optical means 10.

It is preferable that the image output unit 30 be disposed to be inclined with respect to the inner surface of the optical unit 10 so that image light can be reflected at least once from the inner surface of the optical unit 10 and transferred to the reflective unit 20.

Meanwhile, in the present invention, the fact that the image light output from the image output unit 30 is reflected on the inner surface of the optical unit 10 means that the image light is reflected by total internal reflection on the inner surface of the optical unit 10. This implies that the angle of incidence of the image light incident on the inner surface of the optical means 10 needs to be greater than a critical angle for the occurrence of total internal reflection, which is determined by the refractive index of the optical means 10 and the refractive index of the outside (air) of the optical means 10 in order to prevent image light from being transmitted from the inside of the optical means to the outside thereof. Accordingly, the image output unit 30 is disposed such that the angle between the inner surface of the optical means 10 at which the image light output from the image output unit 30 arrives first and the vertical direction of the surface of the image output unit 30 (incident angle) may be greater than the critical angle for the occurrence of total internal reflection determined by the refractive index of the optical means 10 and the refractive index of the outside (air) of the optical means 10.

Meanwhile, here, the image for augmented reality refers to an image displayed on the display device, which is a virtual image provided through a pupil of a user via the reflective unit 20, and may be a still image or moving image. Such an image for augmented reality is output from the display device as image light, and is provided as a virtual image through the pupil 40 of the user via the inner surface of the optical means 10 and the reflective unit 20. At the same time, the user directly recognizes an image of the real world with the eye via the optical means 10. Accordingly, the user may be provided with an augmented reality service.

Meanwhile, although the image output unit 30 is disposed on a right side based on a case where the user gazes forward in FIG. 2, the location of the image output unit 30 is not limited thereto, but the image output unit 30 may be disposed on an upper side, a lower side, or a diagonally upper or lower side. For example, when an apparatus for implementing augmented reality including the optical device 100 for augmented reality according to the present invention is implemented in the form of, e.g., glasses, the image output unit 30 may be disposed at an appropriate location on a glasses frame.

The display device may have only the function of receiving an image signal from an external separate image playback device and then simply displaying an image, or may be integrated with a device having a processor and memory and also having the function of storing and playing back an image.

Since the display device itself is not a direct objective of the present invention and a conventionally known device capable of displaying an image on a screen may be employed, a detailed description thereof will be omitted.

The optical means 10 is a means for transmitting at least part of visible light therethrough, and may be, e.g., a lens. The reflective unit 20 is disposed in the optical means 10.

In this case, transmitting at least part of visible light means that the transmittance of visible light is in the range of 0 to 100%. Assuming that the optical device 100 is located in a forward direction from the pupil 40 of the eye of the user, as shown in FIG. 2, the optical means 10 may transfer visible light, which is an image of the real world, to the pupil 40 by transmitting it therethrough, and reflects image light corresponding to an image for augmented reality to the pupil 40 by means of the reflective unit 20. Accordingly, the image of the real world transmitted through the optical means 10 and the image for augmented reality reflected by the reflective unit 20 may be superimposed on each other and provided to the user. Accordingly, the user may be provided with an augmented reality service.

Furthermore, as described above, the image light corresponding to the image for augmented reality output from the image output unit 30 is reflected at least once by the inner surface of the optical means 10 and transferred to the reflective unit 20.

As shown in FIG. 2, the optical means 10 may be implemented in the form of, e.g., a rectangular lens module, and the lens module may be detachably coupled to an apparatus for implementing augmented reality in the form of glasses. Alternatively, when an apparatus for implementing augmented reality including the optical device 100 for augmented reality according to the present invention is implemented in the form of glasses, the optical means 10 may be implemented in the form of a glasses lens.

The reflective unit 20 is disposed inside the optical means 10, and performs the function of reflecting off image light corresponding to an image for augmented reality, output from the image output unit 30, toward the pupil 40 of the eye of the user. In this case, the image light corresponding to the image for augmented reality output from the image output unit 30 is reflected at least once on the inner surface of the optical means 10 and transferred to the reflective unit 20, and the reflective unit 20 reflects off the image light, transferred through the inner surface of the optical means 10, toward the pupil 40 of the eye of the user.

As shown in FIG. 2, the reflective unit 20 reflects the image light corresponding to the image for augmented reality, output from the image output unit 30, toward the pupil 40, so that the image for augmented reality and the image of the real world are superimposed on each other and provided, thereby enabling an augmented reality service to be provided. In other words, the reflective unit 20 may reflect off the image light, output from the image output unit 30, toward the pupil 40 of the eye of the user, thereby enabling the image for augmented reality, displayed on the display device, to be provided to the user.

To this end, the reflective unit 20 is disposed to have an appropriate angle between the inner surface of the optical means 10 and the pupil 40.

Preferably, the reflective unit 20 is disposed to have an angle that, when the reflective unit 20 is located in front of the pupil 40 of the user, allows image light incident on the center of the reflective unit 20 to be reflected and enter the center of the pupil 40.

For example, in FIG. 2, it is assumed that when the user gazes forward, the reflective unit 20 is located in a forward direction from the pupil 40 and the image output unit 30 is located on a right side in the forward direction from the pupil. Accordingly, in this case, the reflective unit 20 is disposed to have an inclination of about 45 degrees and to be inclined outward in the forward direction from the pupil 40, as shown in FIG. 2(a).

Meanwhile, in the embodiment of FIG. 2, it is preferable that the size of the reflective unit 20 be smaller than that of the human pupil, i.e., 8 mm or less, as described in FIG. 1.

In this case, the size of the reflective unit 20 is defined to mean the maximum length between any two points on the boundary line of the reflective unit 20.

Furthermore, the size of the reflective unit 20 may be the maximum length between any two points on the boundary of the orthogonal projection of the reflective unit 20 projected onto a plane perpendicular to a forward direction from the pupil 40 when the user gazes forward.

Furthermore, the reflective unit 20 may not be disposed at a center in the forward direction from the pupil 40 of the user. In this case, the size of the reflective unit 20 may be the maximum length between any two points on the boundary line of the orthogonal projection of the reflective unit 20 projected onto a plane perpendicular to a direction from the pupil 40 to the reflective unit 20 when the user gazes in the direction of the reflective unit 20.

Furthermore, in the embodiment of FIG. 2, it is preferable that the area of the reflective unit 20 be formed to be smaller than that of the human pupil 40. For example, when the pupils of people are considered to have a circular shape, the diameters of the pupils range from 2 to 8 mm and the radii thereof range from 1 to 4 mm. Accordingly, the areas of the pupils have a maximum of $16\pi$ (mm$^2$) according to the equation "$\pi r^2$," and thus the area of the reflective unit 20 is preferably formed to have a value of $16\pi$ (mm$^2$) or less.

In this case, the area of the reflective unit 20 may be the area of an orthogonal projection obtained by projecting the reflective unit 20 onto a plane perpendicular to the forward direction from the pupil 40 when the user gazes forward.

Furthermore, the reflective unit 20 may not be disposed at the center in the forward direction from the pupil 40 of the user. In this case, the area of the reflective unit 20 may be the area of the orthogonal projection of the reflective unit 20 projected onto a plane perpendicular to the direction from the pupil 40 to the reflective unit 20 when the user gazes in the direction of the reflective unit 20.

Figure 3:
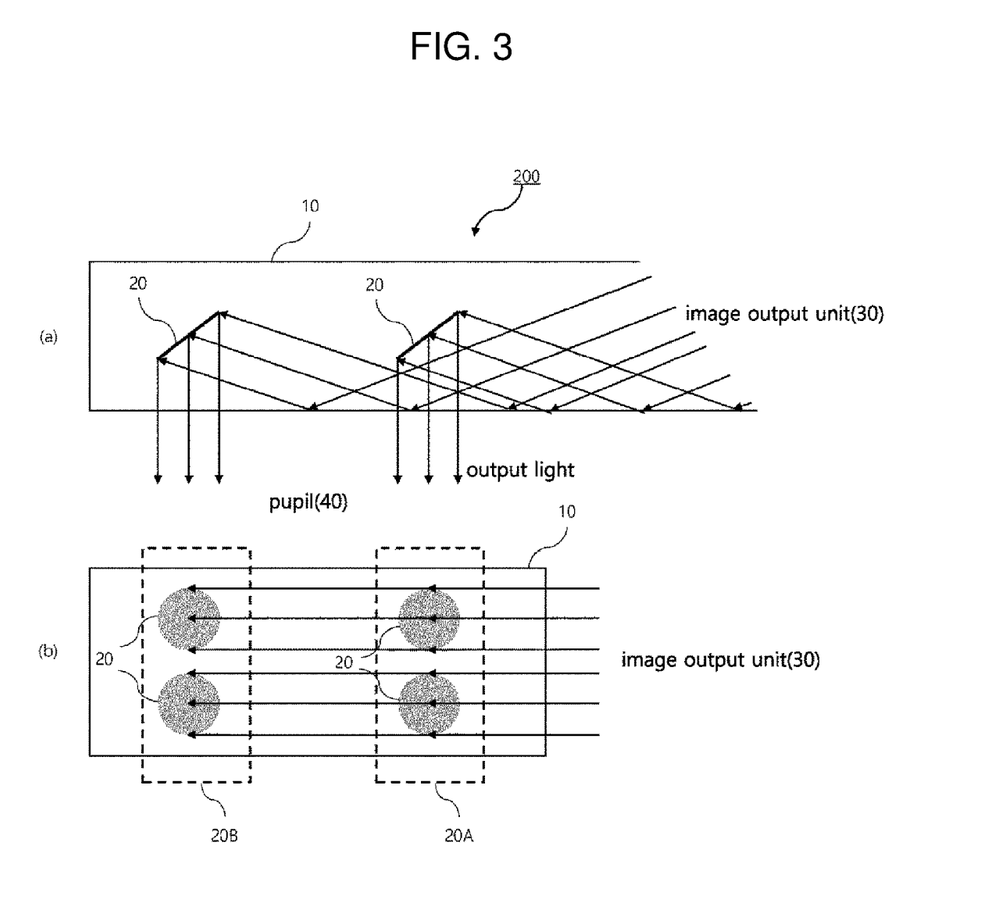
FIG. 3 is a diagram showing an optical device (200) for augmented reality according to another embodiment of the present invention.

FIG. 3 is a diagram showing an optical device 200 for augmented reality according to another embodiment of the present invention, wherein FIGS. 3(a) and 3(b) show a plan view and a front view, respectively, when the optical device 200 for augmented reality is placed in front of a user.

The embodiment of FIG. 3 is basically the same as the embodiment of FIG. 2, but differs in that a plurality of reflective units 20 is disposed.

According to the embodiment of FIG. 3, the image light corresponding to an image for augmented reality output from an image output unit 30 is reflected at least once on the inner surface of the optical means 10, the reflected image light is transferred to the plurality of reflective units 20 in partially separated manner, and the plurality of reflective units 20 reflects off the transferred image light toward the pupil 40 of an eye of the user, thereby providing the image for augmented reality to the user.

In the embodiment of FIG. 3, the reflective units 20 are disposed in a lateral direction (a first direction) inside an optical means 10. The reason for this is that the image output unit 30 is located on a right side. If the image output unit 30 is located above, the reflective units 20 are disposed in a vertical direction inside the optical means 10.

In other words, the first direction, which is the direction in which the plurality of reflective units 20 is disposed, refers to a direction in which, when the user gazes forward in the state where the optical device 200 for augmented reality is placed in front of the user, the direction is parallel to the inner surface of the optical means 10 and the image output unit 30 is located.

Meanwhile, as shown in FIG. 3(b), a plurality of reflective units 20 may be additionally disposed in second directions that are directions perpendicular to the first direction. In this case, the reflective units 20 disposed in each of the second directions form a corresponding reflective unit group 20A or 20B.

Meanwhile, in the embodiment of FIG. 3, the reflective unit 20 closer to the image output unit 30 is disposed so that it may not block the image light incident on the reflective unit 20 disposed downstream of the former reflective unit 20. This may be achieved by appropriately adjusting the angle of the image output unit 30, the distance between and angles of the reflective units 20, and the thickness of the optical means 10 (in the vertical direction in FIG. 3(a)). For example, the thickness of the optical means 10, the distance between and angles of the reflective units 20 may be fixed, and then the angle of incidence at which the image light from the image output unit 30 enters the inner surface of the optical means 10 may be adjusted.

Figure 4:
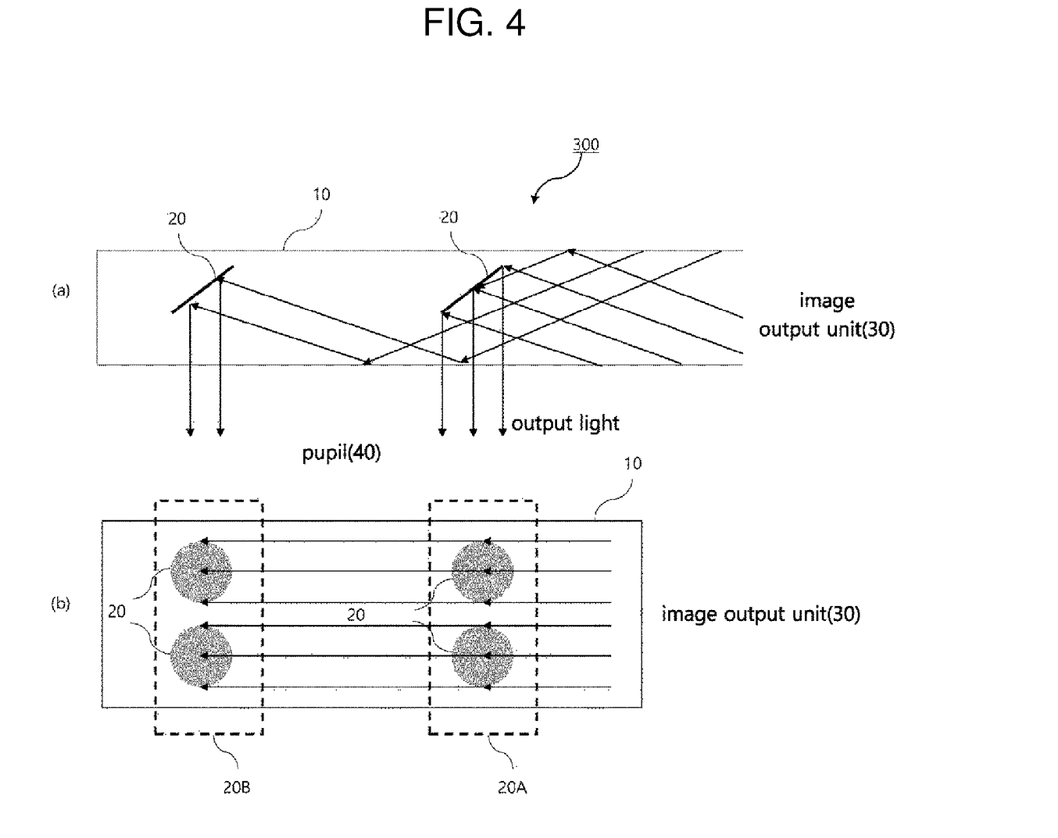
FIG. 4 is a diagram showing an optical device (300) for augmented reality according to still another embodiment of the present invention.

FIG. 4 is a diagram showing an optical device 300 for augmented reality according to still another embodiment of the present invention, wherein FIGS. 4(a) and 4(b) show a plan view and a front view, respectively, when the optical device 300 for augmented reality is placed in front of a user.

The embodiment of FIG. 4 is basically the same as the embodiment of FIG. 3, but is characterized in that a reflective unit 20 closer to an image output unit 30 is disposed to partially block the image light incident on a reflective unit 20 disposed downstream of the former reflective unit 20. In this case, partial image light is blocked by the upstream reflective unit 20 and is not transferred to the downstream reflective unit 20. However, this does not cause a problem when the proportion of the blocked image light is considerably smaller than that of the incident image light. Accordingly, in unavoidable cases attributable to conditions such as the angle of the image output unit 30, the distance between and angles of the reflective units 20, and the thickness of the optical means 10, the reflective unit 20 closer to an image output unit 30 may be disposed to partially block the image light incident on the reflective unit 20 disposed downstream of the former reflective unit 20, as shown in FIG. 4.

Figure 5:
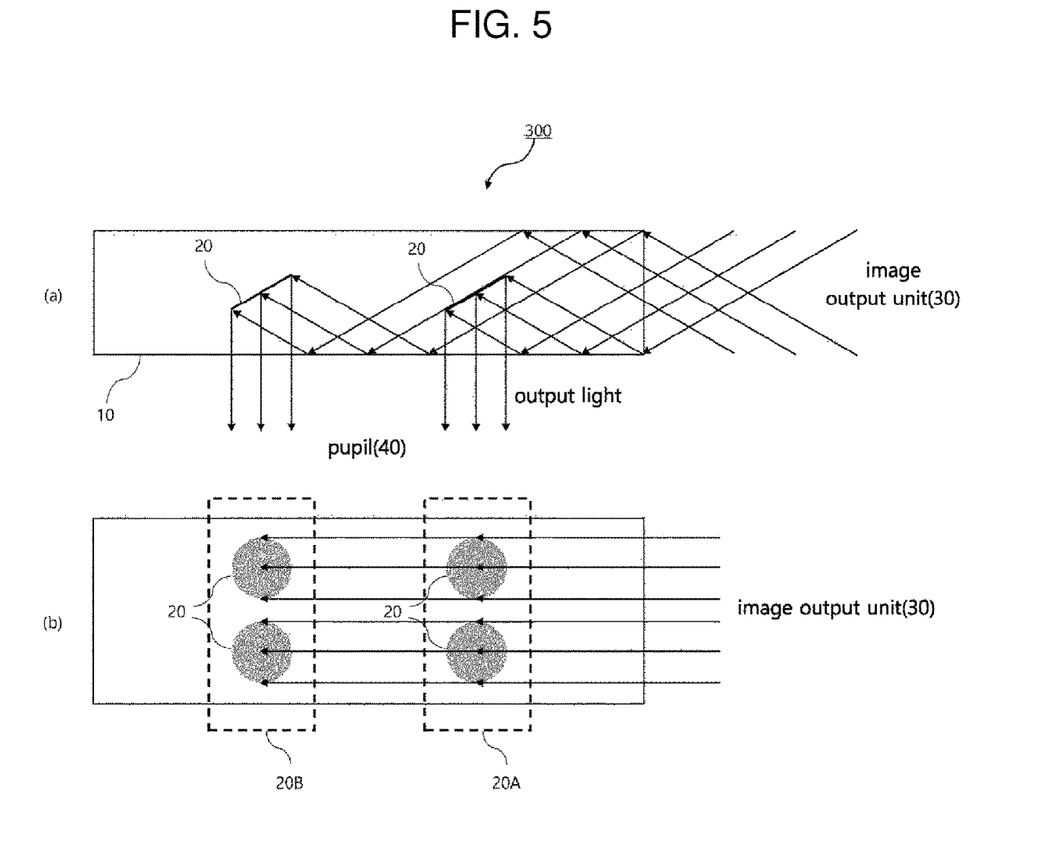
FIG. 5 is a diagram showing an optical device (400) for augmented reality according to still another embodiment of the present invention.

FIG. 5 is a diagram showing an optical device 400 for augmented reality according to still another embodiment of the present invention, wherein FIGS. 5(a) and 5(b) show a plan view and a front view, respectively, when the optical device 400 for augmented reality is placed in front of a user.

The embodiment of FIG. 5 is similar to the embodiments of FIGS. 3 and 4, but is characterized in that reflective units 20 are disposed such that the angle formed by each of the reflective units 20 with respect to the inner surface of an optical unit 10 is the same as the angle formed by the image light, reflected from the inner surface of the optical unit 10 and passing through the reflective unit 20, with respect to the inner surface of the optical means 10.

According to the embodiment of FIG. 5, the inclination angle of each of the reflective units 20 with respect to the inner surface of the optical unit 10 and the inclination angle of the image light, passing through the reflective unit 20, with respect to the inner surface of the optical unit 10 are made the same, so that the reflective unit 20 closer to the image output unit 30 can be prevented from blocking the image light incident on the reflective unit 20 disposed downstream of the former reflective unit 20.

Figure 6:
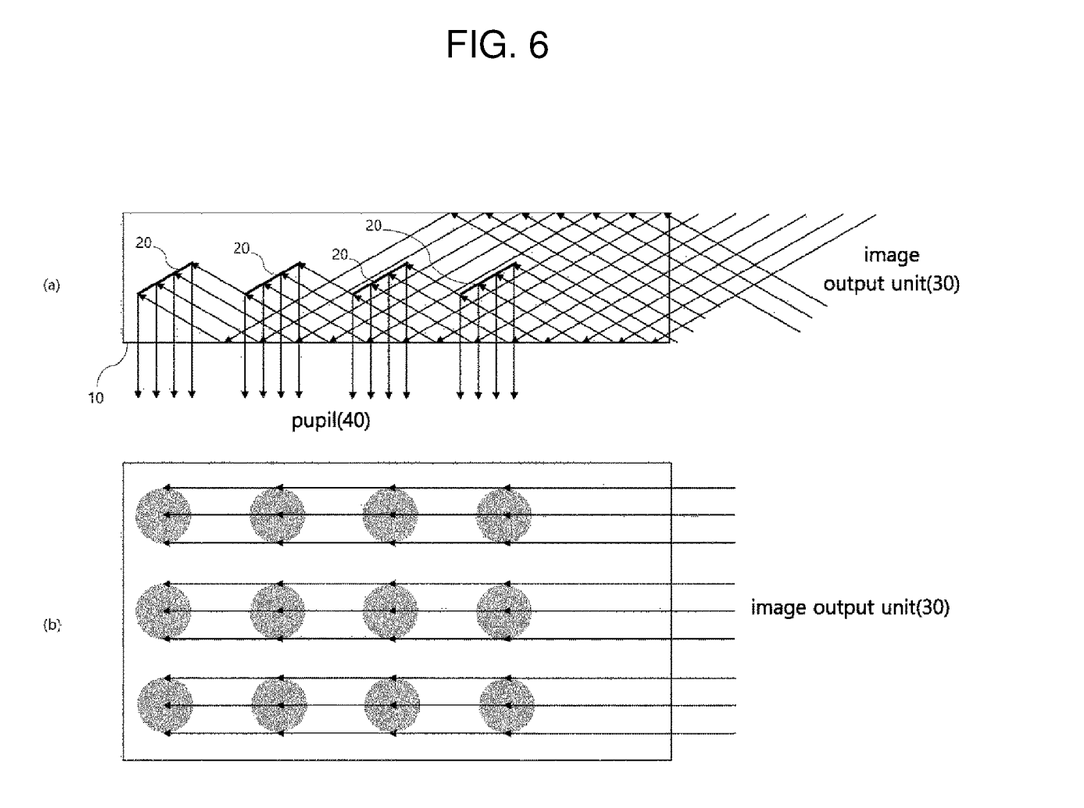
FIG. 6 is a diagram showing an optical device (500) for augmented reality according to still another embodiment of the present invention.

FIG. 6 is a diagram showing an optical device 500 for augmented reality according to still another embodiment of the present invention, wherein FIGS. 6(a) and 6(b) show a plan view and a front view, respectively, when the optical device 500 for augmented reality is placed in front of a user.

The embodiment of FIG. 6 is a combination of the embodiment of FIG. 3 and the embodiment of FIG. 5, and is characterized in that reflective units 20 are disposed such that the angle formed by each of the reflective units 20 with respect to the inner surface of the optical unit 10 and the angle formed by the image light, passing through the reflective unit 20, with respect to the inner surface of the optical unit 10 are made the same and thus the reflective unit 20 closer to an image output unit 30 can be prevented from blocking the image light incident on the reflective unit 20 disposed downstream of the former reflective unit 20.

Meanwhile, in the present invention, each of the plurality of reflective units 20 is characterized in that it is disposed such that the distance d to adjacent reflective units 20 is smaller than the size of the human pupil 40.

In general, it is known that the sizes (diameters) of the pupils of people range from 2 to 8 mm on average. Accordingly, it is preferable that each of the plurality of reflective units 20 in the present invention be disposed such that the distance to adjacent reflective units 20 is 8 mm or less.

In this case, the distance d (or the interval d) between the reflective units 20 may be the minimum value between points on the boundary lines of two adjacent reflective units 20 when the plurality of reflective units 20 is viewed from a location in front of the plurality of reflective units 20.

Furthermore, the distance d (or the interval d) between the reflective units 20 may be the minimum value between points on the boundary lines of the orthogonal projections of the reflective units 20 projected onto a plane perpendicular to a forward direction from the pupil 40 when the user gazes forward.

Furthermore, the reflective units 20 may not be disposed at a center in the forward direction from the pupil of the user. In this case, the distance d (or the interval d) between the reflective units 20 may be the minimum value between points on the boundary lines of the orthogonal projections of the reflective units 20 projected onto a plane perpendicular to a direction from the pupil 40 to the reflective units 20 when the user gazes in the direction of the reflective units 20.

Meanwhile, the distances d between the plurality of reflective units 20 are preferably the same, but are not necessarily the same. The distances d may be partially different when necessary.

Meanwhile, in the present invention, it is preferable that the size of each of the plurality of reflective units 20 be also smaller than the size of the human pupil, as described above. In other words, it is preferable that the size of each of the plurality of reflective units 20 be 8 mm or less, as described in the embodiment of FIG. 2.

Meanwhile, the sizes of the plurality of reflective units 20 are preferably the same, but are not necessarily the same. The sizes may be partially different when necessary.

Furthermore, in the present invention, it is preferable that the area of the plurality of reflective units 20 be formed to be smaller than the area of the human pupil 40, as described above.

Meanwhile, the areas of the plurality of reflective units 20 are preferably the same, but are not necessarily the same. The areas may be partially different when necessary.

While the embodiments according to the present invention have been described above, the present invention is not limited to the above embodiments, and other various modifications and alterations may be possible without departing from the scope of the present invention based on the claims and the drawings.

For example, in the case where there is a plurality of reflective units 20, the reflective units 20 have been described as being disposed on the same plane when viewed based on a plan view in the above embodiment, a three-dimensional implementation may be made by placing the reflective units 20 on different planes.

The invention claimed is:

1. An optical device for augmented reality, the optical device comprising:
    an optical means for transmitting at least part of visible light therethrough;
    a reflective unit disposed inside the optical means; and
    an image output unit configured to output image light corresponding to an image for augmented reality toward an inner surface of the optical means;
    wherein the image light corresponding to the image for augmented reality output from the image output unit is reflected at least once by the inner surface of the optical means and transferred to the reflective unit;
    wherein a size of the reflective unit is 8 mm or less; and
    wherein the reflective unit reflects the transferred image light toward a pupil of an eye of a user, thereby providing the image for augmented reality to the user.

2. The optical device of claim 1, wherein an area of the reflective unit is formed to have a value of $16\pi$ (mm$^2$) or less.

3. The optical device of claim 2, wherein the area of the reflective unit is an area of an orthogonal projection of the reflective unit projected onto a plane perpendicular to a forward direction from the pupil when the user gazes forward.

4. An optical device for augmented reality, the optical device comprising:
    an optical means for transmitting at least part of visible light therethrough;
    a plurality of reflective units disposed inside the optical means; and
    an image output unit configured to output image light corresponding to an image for augmented reality toward an inner surface of the optical means;
    wherein the image light corresponding to the image for augmented reality output from the image output unit is reflected at least once by the inner surface of the optical means and transferred to the plurality of reflective units in partially separated manner;
    wherein each of the plurality of reflective units is disposed such that a distance to an adjacent reflective unit is 8 mm or less; and
    wherein the plurality of reflective units reflects off the transferred image light toward a pupil of an eye of a user, thereby providing the image for augmented reality to the user.

5. The optical device of claim 4, wherein each of the plurality of reflective units is disposed parallel to the inner surface of the optical means and alongside another of the plurality of reflective units in a first direction, which is a direction in which the image output unit is located, when viewed in a state in which the optical device is placed in front of the user.

6. The optical device of claim 5, wherein another plurality of reflective units is additionally disposed in a second direction that is perpendicular to the first direction.

7. The optical device of claim 4, wherein a reflective unit closer to the image output unit than a downstream reflective unit is disposed not to prevent image light output by the image output unit from being incident on the downstream reflective unit.

8. The optical device of claim 4, wherein a reflective unit closer to the image output unit than a downstream reflective unit is disposed to prevent part of image light output by the image output unit from being incident on the downstream reflective unit.

9. The optical device of claim 4, wherein each of the plurality of reflective units is disposed such that an angle formed by each of the reflective units with respect to the inner surface of the optical unit is same as an angle formed by the image light, reflected from the inner surface of the optical unit and passing by the reflective unit, with respect to the inner surface of the optical unit.

10. The optical device of claim 4, wherein the distance between the adjacent reflective units is a minimum value between points on boundary lines of orthogonal projections of the adjacent reflective units projected onto a plane perpendicular to a forward direction from the pupil when the user gazes forward.

* * * * *